3,271,559
METHOD OF ARC WELDING
Bernhard W. A. Weber, Scarsdale, N.Y., assignor, by mesne assignments, to Air Reduction Company Incorporated, New York, N.Y., a corporation of New York
No Drawing. Filed May 9, 1961, Ser. No. 108,713
5 Claims. (Cl. 219—137)

This invention relates to welding.

It is an object of this invention to provide a welding rod or electrode which can be used to form a weld particularly characterized by its generally superior properties including high tensile strength, high resistance to corrosion, and improved high temperature properties. It is another object of this invention to provide a welding rod or electrode which permits economic attainment of these improved properties when the weld is made by gas welding or by electric arc welding including manual arc welding, submerged arc welding, inert arc welding, etc. It is a further object of this invention to provide a novel method of welding.

In accordance with certain of its aspects, the improved welding rod of this invention may contain 0.01%–1.0% of uranium.

It is a feature of this invention that the hereinbefore noted desiderata may be obtained even when the core wire of the welding electrode is formed from an inexpensive steel for example, a plain carbon or a ferritic alloy steel, and that novel rods or electrodes formed even from these cheap steels permit production of welds which have unexpectedly superior properties including high endurance limit, increase in ratio of endurance limit to tensile strength, and superior resistance to stress corrosive attacks in a variety of environments. It will be apparent to those skilled in the art that the term *electrode* is commonly used when the weld is to be produced by electric arc techniques and that the term *rod* is commonly used when the weld is to be produced by gas-type welding techniques. The two terms may be used interchangeably in this application.

In accordance with the preferred embodiment of this invention, uranium may be incorporated into the steel base core wire during the formation thereof—i.e., the steel base core wire may be formed from an alloy which contains uranium. In accordance with another embodiment of this invention, the base core wire may be hollow and contain an inner core of uranium.

Other equivalent techniques of forming the welding rod containing uranium will be apparent to those skilled in the art.

In the practice of this invention, the uranium will be present in amount sufficient to give the hereinbefore noted results. It is possible to produce welds in accordance with this invention characterized by their high tensile strength, their higher resistance to corrosion, and their improved high temperature properties, by the use of electrodes containing uranium in various proportions. In practice, however, it is preferred to prepare welds containing 0.01%–1% uranium, and more preferably 0.01%–0.25% uranium, and it is preferred that the welding rod or electrode contain substantially these percentages of uranium. Consistently superior welds may normally be obtained by use of a steel electrode containing 0.01%–0.03% uranium.

It will be obvious to those skilled in the art that some of the uranium may commingle with the slag, or otherwise fail to transfer to the weld and be lost; accordingly, in practice it may be desirable to use amounts of uranium which are higher than the noted ranges.

Welding rods or electrodes prepared in accordance with this invention may be used to weld a wide range of steels to produce welded assemblies wherein the weld strength is at a maximum.

In accordance with a specific embodiment of the invention, a welding rod was formed from a steel wire containing 0.4% carbon, 0.8% manganese, 0.2% silicon, and 0.02% uranium. Tests indicated that the composition of this welding rod had an ultimate tensile strength in excess of 200,000 pounds per square inch. Superior results were consistently obtained in fatigue tests and high temperature creep rupture tests. It was noted that in the latter tests the rating (in terms of hours for a standard sample to rupture when subjected to a high stress at high temperature) may be more than 1000 times greater than that of a steel containing no uranium.

The use of welding rods prepared in accordance with this invention includes the steps of juxtaposing a conductive member on which metal is to be deposited and a metal electrode containing uranium; melting the electrode at point of juxtaposition; depositing on said conductive member molten metal containing uranium; and permitting the molten metal to coalesce. The weld so produced may contain 0.01%–1% uranium in a base of steel and is particularly useful under conditions of extreme stress. It possesses superior resistance to corrosion.

As many embodiments of this invention may be made without departing from the spirit and scope thereof, it is to be understood that the invention includes all such modifications and variations as come within the scope of the appended claims.

I claim:
1. The method of welding which comprises juxtaposing a conductive member on which metal is to be deposited and a steel electrode containing 0.01%–1% uranium; melting said electrode at the point of juxtaposition; depositing on said conductive member molten steel containing uranium; and permitting said molten steel containing uranium to coalesce on said conductive member.
2. The method of claim 1 wherein said steel electrode contains about 0.8% manganese and about 0.2% silicon.
3. The method of claim 2 wherein said steel electrode contains about 0.4% carbon.
4. The method of claim 3 wherein said steel electrode contains between about 0.01% and 0.03% uranium.
5. The method of claim 4 wherein said steel electrode contains about 0.02% uranium.

References Cited by the Examiner
UNITED STATES PATENTS

| | | | |
|---|---|---|---|
| 1,247,252 | 11/1917 | Flannery | 75—123 |
| 1,363,636 | 12/1920 | Brace | 219—146 |
| 1,366,254 | 1/1921 | Foote | 75—123 |
| 1,501,266 | 7/1924 | Brace | 219—146 |
| 1,545,094 | 7/1925 | Giles | 75—122.5 |
| 1,704,978 | 3/1929 | Knott | 219—146 |
| 1,783,013 | 3/1930 | Green | 117—202 |
| 2,043,855 | 6/1936 | Keller | 75—122.5 |

ANTHONY BARTIS, *Acting Primary Examiner.*
RICHARD M. WOOD, JOSEPH V. TRUHE, *Examiners.*